Sept. 2, 1952 E. L. KROGUE 2,608,787
FISH LURE
Filed March 4, 1949
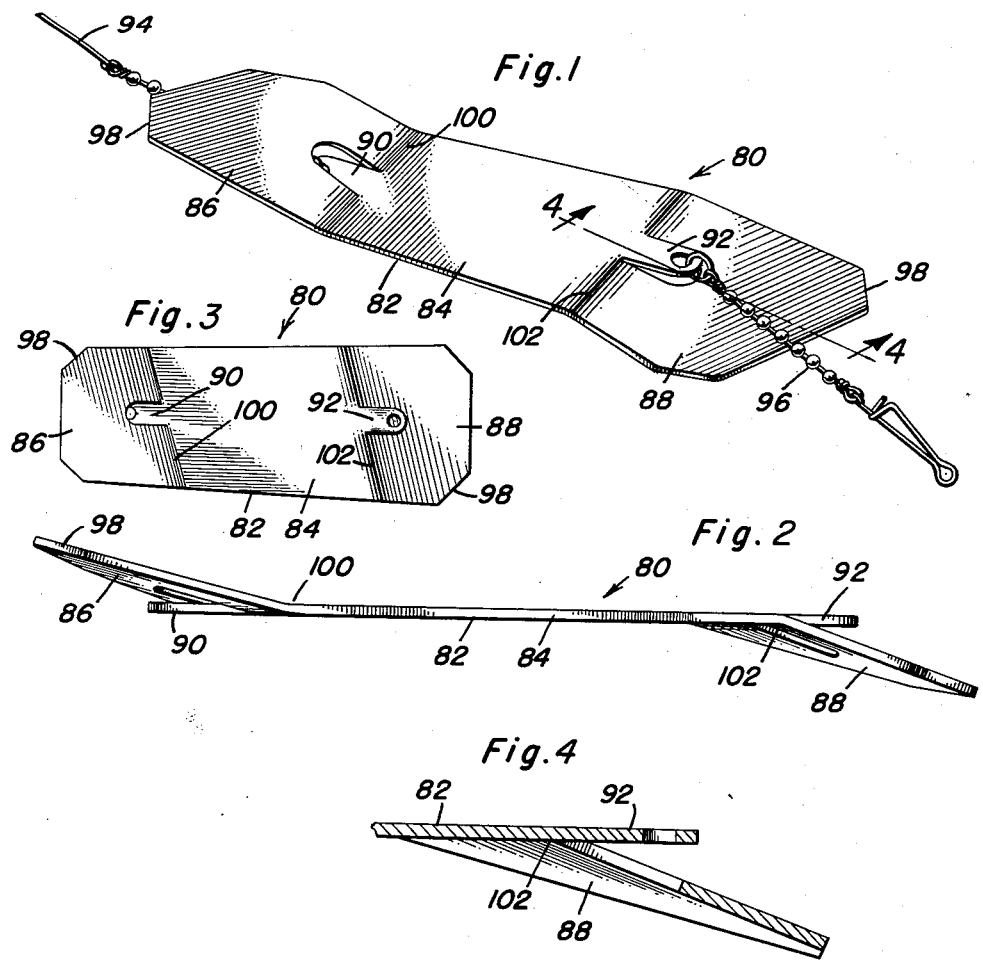
Eldon L. Krogue
INVENTOR.

Patented Sept. 2, 1952

2,608,787

UNITED STATES PATENT OFFICE 2,608,787

FISH LURE

Eldon L. Krogue, Seattle, Wash.

Application March 4, 1949, Serial No. 79,614

1 Claim. (Cl. 43—42.5)

This invention relates to new and useful improvements and structural refinements in fish lures, particularly lures intended for attracting large fish, and the principal object of the invention is to eliminate axial, rotating movement to which conventional fish lures are usually subjected when drawn through water, and which movement, by virtue of its unnatural character, is not effective in creating the proper visual impression on the fish.

This object is achieved by the provision of a fish lure which, in place of rotating about its longitudinal axis, is intended to travel a zig-zagged path, thus effectively reproducing the actual movement of small fish in water.

An important feature of the invention resides in the provision of means in the fish lure whereby this zig-zagged travel is effected.

Another feature of the invention lies in the provision of means for connecting the lure to a fishing line and for connecting a fish hook to the lure.

Some of the advantages of the invention reside in its simplicity of construction and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a perspective view of the invention.

Figure 2 is a side elevational view thereof but with the fishing line and hook connections removed.

Figure 3 is a top plan view on a reduced scale, and

Figure 4 is a fragmentary cross sectional view, taken substantially in the plane of the line 4—4 in Figure 1.

Like characters of reference are employed to designate like parts in the specification and throughout the several views.

Referring now to the accompanying drawings in detail the invention is designated generally by the reference character 80, and consists of an elongated and longitudinally tapered plate 82 having a horizontal intermediate portion 84 and a pair of angulated end portions or deflectors 86, 88 which are directed to opposite sides of the intermediate portion and which, in turn, are provided with struck out tongues 90, 92 respectively for connection to a fishing line 94 and a fish hook fastening element 96.

The corners of the plate 82 may be rounded, or alternatively, chamfered or beveled as indicated at 98, and it will be observed that the bend lines 100, 102 between the plate portions 84, 86 and 84, 88 respectively are substantially parallel but extend obliquely of the plate, so that the deflectors 86, 88 are transversely tapered in relatively opposite directions, as is best shown in Figure 3.

By virtue of this arrangement the fish lure when drawn through water will not only be subjected to zig-zagging movement in a vertical plane, but also in a horizontal plane, since water pressure will be exerted alternately on the under surfaces of the wider ends, so to speak, of the transversely tapered deflectors 86, 88, which wider ends are disposed at the relatively opposite sides of the lure.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

In a fish lure, a body comprising an elongated plate having straight front and rear transverse edges and bevelled corners, said plate including a flat intermediate portion, a forwardly and upwardly extending front portion and a rearwardly and downwardly extending rear portion, said intermediate and front and rear portions having straight lateral edges, and a pair of flat tongues struck out from the respective front and rear portions of the plate and constituting longitudinal and coplanar continuations of the respective front and rear ends of said intermediate portion, said tongues being provided with apertures for attachment to a fishing line and a fishhook leader respectively.

ELDON L. KROGUE.

REFERENCES CITED

The following references are of record in the file of this patent:

UNITED STATES PATENTS

| Number | Name | Date |
| --- | --- | --- |
| D. 138,088 | Moblo et al. | June 13, 1944 |
| 1,317,890 | Patton | Oct. 7, 1919 |
| 1,837,656 | Crosby | Dec. 22, 1931 |
| 2,235,905 | Sherwood | Mar. 25, 1941 |
| 2,254,981 | Sisco | Sept. 2, 1941 |